United States Patent
Polak et al.

(10) Patent No.: US 12,467,994 B2
(45) Date of Patent: Nov. 11, 2025

(54) METHOD FOR ACQUIRING A MAGNETIC RESONANCE IMAGE DATASET AND GENERATING A MOTION-CORRECTED IMAGE DATASET

(71) Applicants: Siemens Healthcare GmbH, Erlangen (DE); The General Hospital Corporation, Boston, MA (US)

(72) Inventors: Daniel Polak, Erlangen (DE); Daniel Nicolas Splitthoff, Uttenreuth (DE); Stephen Farman Cauley, Winchester, MA (US)

(73) Assignees: Siemens Healthineers AG, Forchheim (DE); The General Hospital Corporation, Boston, MA (US)

( * ) Notice: Subject to any disclaimer, the term of this patent is extended or adjusted under 35 U.S.C. 154(b) by 89 days.

(21) Appl. No.: 18/519,741

(22) Filed: Nov. 27, 2023

(65) Prior Publication Data
US 2024/0201297 A1    Jun. 20, 2024

(30) Foreign Application Priority Data
Dec. 15, 2022  (EP) .................................. 22213936

(51) Int. Cl.
  *G01R 33/48*   (2006.01)
  *G01R 33/385*  (2006.01)
  *G01R 33/565*  (2006.01)

(52) U.S. Cl.
  CPC ....... *G01R 33/4818* (2013.01); *G01R 33/385* (2013.01); *G01R 33/56509* (2013.01)

(58) Field of Classification Search
  CPC .............. G01R 33/4818; G01R 33/385; G01R 33/56509; G01R 33/482; G01R 33/4822;
  (Continued)

(56) References Cited

U.S. PATENT DOCUMENTS

| | | | |
|---|---|---|---|
| 7,482,806 B2 * | 1/2009 | Stemmer | G01R 33/5617 |
| | | | 324/307 |
| 7,715,899 B2 | 5/2010 | Harvey | |

(Continued)

OTHER PUBLICATIONS

Chen, et al., "Interleaved single-shot 2-9 EPI for geometric distortion improvement"; published Apr. 30, 2021, Berkeley, pp. 1-3.
(Continued)

*Primary Examiner* — G.M. A Hyder
(74) *Attorney, Agent, or Firm* — Lempia Summerfield Katz LLC (57) ABSTRACT

A method is provided for acquiring a magnetic resonance image dataset of an object, using an imaging protocol in which several k-space lines are acquired in one echo train, wherein the echo train may include one or several sub echo trains, and wherein the imaging protocol includes a plurality of echo trains. Within the method, a set of additional k-space lines within a central region of k-space is acquired a number of times per echo train, wherein the number is greater than 1, in order to detect movement of the object during the echo train. The sets of additional k-space lines are acquired at pre-determined positions within the echo trains. The disclosure is also directed to a method for generating a motion-corrected magnetic resonance image dataset from the dataset thus acquired, a magnetic resonance imaging apparatus, and a computer program.

16 Claims, 7 Drawing Sheets

(58) Field of Classification Search
CPC ............ G01R 33/4824; G01R 33/5602; G01R 33/5611; G01R 33/5616; G01R 33/5617
See application file for complete search history.

(56) References Cited

U.S. PATENT DOCUMENTS

| | | |
|---|---|---|
| 2008/0129289 A1 | 6/2008 | Stemmer |
| 2021/0373105 A1 | 12/2021 | Polak et al. |
| 2022/0326330 A1* | 10/2022 | Polak ................ G01R 33/4818 |
| 2023/0160989 A1 | 5/2023 | Polak |
| 2023/0293039 A1 | 9/2023 | Polak |

OTHER PUBLICATIONS

Cordero-Grande L. et al., "Motion-corrected MRI with DISORDER: Distributed and incoherent sample orders for reconstruction deblurring using encoding redundancy", Magn Reson Med. 2020; 84, pp. 713-726.

Cordero-Grande, et al. "Sensitivity Encoding for Aligned Multishot Magnetic Resonance Reconstruction" IEEE Transactions on Computational Imaging, vol. 2, No. 3, Sep. 2016, pp. 266-280.

Cordero-Grande, et al., "Three-dimensional motion corrected sensitivity encoding reconstruction for multi-shot multi-slice MRI: application to neonatal brain imaging. Magnetic Resonance in Medicine", 2018, 79. Jg., Nr. 3, pp. 1365-1376.

Hamilton, et al.: "Recent Advances in Parallel Imaging for MRI", Prog. Nucl. Magn. Reson. Spectrosc; 101 (2017), pp. 1-60.

Haskell, et al. "Targeted Motion Estimation and Reduction (TAMER): Data Consistency Based Motion Mitigation for MRI using a Reduced Model Joint Optimization" IEEE, vol. 37, Nr. 5, 2018, pp. 1253-1265.

Moulin, et al., "Prospective correction of multi-shot diffusion imaging using motion compensation and dual-speed EPI"; published Apr. 22, 2022, pp. 1-6.

Hamilton, et al.: "Recent Advances in Parallel Imaging for MRI", Prog. Nucl. Magn. Reson. Spectrosc; 101 (2017), pp. 71-95.

Polak et al., "Linear+: An optimized sequence reordering for robust scout accelerated retrospective motion estimation and correction", published Apr. 22, 2022, pp. 1-6.

Polak et al., "Motion guidance lines for robust data consistency-based retrospective motion correction in 2D and 3D MRI", Magnetic Resonance in Medicine; (Feb. 6, 2023), pp. 1777-1790.

Polak et al., "Scout accelerated motion estimation and reduction" (SAMER), vol. 87, Issue1, Jan. 2022, pp. 163-178.

Polak, et al. "Separable motion estimation and correction for 2D TSE imaging using a rapid 3D volumetric scout acquisition", published Apr. 30, 2021, pp. 1-5.

Polak, et al.: "Scout Acquisition enables rapid Motion Estimation (SAME) for fully separable retrospective motion mitigation,", in Proceedings of ISMRM 28th Annual Meeting, 2020, pp. 1-9.

Pruessmann, et al., "SENSE: Sensitivity Encoding for Fast MRI", Magnetic Resonance in Medicine 42, 1999, pp. 952-962.

* cited by examiner

$$[\hat{x}] = \mathrm{argmin}_x \| E_{\hat{\theta}} x - s \|_2^2$$

$$[\hat{\theta}] = \mathrm{argmin}_\theta \| E_\theta \hat{x} - s \|_2^2$$

FIG 7

$[\hat{\theta}_i] = \mathrm{argmin}_{\theta_i} \| E_{\theta_i} \hat{x} - s_i \|_2^2$ — 54

$[\hat{x}] = \mathrm{argmin}_x \| E_{\hat{\theta}} x - s \|_2^2$ — 56

METHOD FOR ACQUIRING A MAGNETIC RESONANCE IMAGE DATASET AND GENERATING A MOTION-CORRECTED IMAGE DATASET

The present patent document claims the benefit of European Patent Application No. 22213936.2, filed Dec. 15, 2022, which is hereby incorporated by reference in its entirety.

TECHNICAL FIELD

The disclosure relates to a method for acquiring a magnetic resonance image dataset of an object, and to generating a motion-corrected image dataset from k-space data acquired using such a method. The disclosure also relates to a magnetic resonance imaging apparatus and a computer-readable medium.

BACKGROUND

Patient motion may degrade the diagnostic quality of magnetic resonance (MR) exams. Fast imaging protocols may reduce the impact of motion. For example, parallel imaging techniques, (as summarized in J. Hamilton et al., "Recent Advances in Parallel Imaging for MRI," Prog. Nucl. Magn. Reson. Spectrosc., vol. 101, pp. 71-95, 2017), exploit the properties of modern multi-channel coil arrays to separate aliased pixels in the image domain or to estimate missing k-space data, using knowledge of nearby acquired k-space points, in order to allow scan time reduction by sampling a smaller number of phase encoding lines in k-space.

Some magnetic resonance imaging (MRI) motion correction techniques involve measuring the motion by tracking devices or navigator acquisitions.

By contrast, retrospective methods correct for motion artefacts after the data acquisition without disruptions to the sequence timing or inclusion of additional hardware. By including motion operations into the MR forward model, these techniques account for the patient's motion in the final image reconstruction and therefore reduce motion artefacts through improved model agreement. Data-driven retrospective correction techniques allow for the motion data to be derived from the acquired k-space data itself. In the case of parallel imaging, this is facilitated because the complex sensitivity profiles of multi-channel coil arrays inherently encode the patient position into the acquired k-space data. For multi-shot acquisitions, the goal in retrospective motion correction techniques is to extract the per shot rigid-body motion parameters and the motion-free image simultaneously. This may be accomplished by either minimizing an image quality metric, such as image entropy, or by minimizing the data consistency error of a parallel "imaging+motion" forward model, (as described in L. Cordero-Grande et al., "Three-dimensional motion corrected sensitivity encoding reconstruction for multi-shot multi-slice MRI: Application to neonatal brain imaging," Magn. Reson. Med., vol. 79, no. 3, pp. 1365-1376, 2018; J. Cordero-Grande et al., "Sensitivity Encoding for Aligned Multishot Magnetic Resonance Reconstruction," IEEE Trans. Comput. Imaging, vol. 2, no. 3, pp. 266-280, 2016; and M. W. Haskell et al., "TArgeted Motion Estimation and Reduction (TAMER): Data consistency based motion mitigation for mri using a reduced model joint optimization," IEEE Trans. Med. Imaging, vol. 37, no. 5, pp. 1253-1265, 2018). For the latter, the motion and image vector are jointly estimated via an inversion of the non-linear forward model. This corresponds to a large-scale non-linear optimization problem that may be computationally very expensive. Previously proposed methods alternate between optimizing just the image or the motion parameters while assuming the other to be fixed (see L. Cordero-Grande in Magn. Reson. Med.), instead of updating all optimization variables at once. Nevertheless, repeated updates of the imaging voxels lead to excessive computation that prohibits its use in clinical settings. When the "imaging+motion" model and the underlying imaging protocol also includes parallel imaging techniques which make use of the complex sensitivity profiles of multi-channel coil arrays, such as SENSE (SENSitivity Encoding) or ASSET (Array coil Spatial Sensitivity Encoding), it is referred to as "SENSE+motion" model.

In "Scout accelerated motion estimation and reduction (SAMER)", Magn. Reson. Med., vol. 87, pp. 163-178, 2022, D. Polak et al., a technique is described that utilizes a single rapid scout scan to drastically reduce the computation cost of motion estimation.

It has been found that the robustness and speed of retrospective motion estimation may be further improved by using optimized reordering schemes for rectilinear three-dimensional (3D) multi-shot acquisitions. "Reordering scheme," "reordering," or "sampling order" may refer to the order in which k-space lines are acquired, in particular the order in which the phase-encode plane is sampled, such as linear or radial. For example, L. Cordero-Grande et al., "Motion-corrected MRI with DISORDER: Distributed and incoherent sample orders for reconstruction deblurring using encoding redundancy," Magn. Reson. Med., vol. 84, pp. 713-726, 2020, propose a jittered checkerboard reordering scheme for 3D acquisitions (referred to herein as "checkered"). By uniformly distributing the samples of each shot across k-space, this reordering was shown to have computational advantages, including improved convergence stability and speed.

Most retrospective motion correction techniques only estimate one set of motion parameters per shot, e.g., per echo train having a length in a range of 1-2 seconds. However, for certain motion patterns, like "heavy breathing" motion, this temporal resolution may be insufficient to mitigate all motion artefacts. This is because patient motion may occur on timescales smaller than the duration of one shot and neglecting these changes in the motion parameters may lead to residual artefacts in the final image reconstruction. However, estimating motion at higher temporal resolution is difficult, especially when no external tracking hardware (e.g., camera) is available. Fully retrospective motion correction methods would be theoretically capable of estimating more than one set of motion parameters per shot. However, these data-driven techniques require estimating hundreds of coupled temporal motion parameters by solving a large non-linear inverse problem, which is extremely demanding computationally and potentially non-convex and therefore has impeded implementation in clinical settings.

SUMMARY AND DESCRIPTION

It is therefore an object to provide a method of acquiring a magnetic resonance image dataset of an object, which includes sufficient data to allow for robust and fast-converging retrospective motion correction at high temporal resolution, especially at a temporal resolution greater than one motion state per shot. It is a further object to provide a method of generating a motion-corrected MR image, which may run on standard clinical reconstruction hardware and yet allows to correct for fast movement, including heavy breathing.

These objects are met or exceeded by the acquisition method, the method for generating a motion-corrected MRI dataset, the MRI apparatus, and the computer program disclosed herein. The scope of the present disclosure is defined solely by the appended claims and is not affected to any degree by the statements within this summary. The present embodiments may obviate one or more of the drawbacks or limitations in the related art.

A method is provided for acquiring a magnetic resonance (MR) image dataset of an object using an imaging protocol in which spatial encoding is performed using phase encoding gradients along at least one spatial dimension, and frequency encoding gradients along another spatial dimension. K-space is sampled during the acquisition in a plurality of k-space lines oriented along the frequency encoding direction. Several k-space lines are acquired in one echo train, wherein the imaging protocol includes a plurality of echo trains, and wherein an echo train may include one or several sub echo trains. The method is characterized in that a set of additional k-space lines within a central region of k-space is acquired a number of times per echo train in more than 85% of the echo trains, wherein the number is greater than one, the additional k-space lines being acquired in addition to those that are required under the imaging protocol to acquire an MR image, and in that the sets of additional k-space lines are acquired at pre-determined positions within the echo trains.

The sets of additional k-space lines are important for motion estimation, in particular to detect movement of the object throughout an echo train, because for this purpose it is useful to have the central area of k-space sampled at regular intervals. The additional k-space lines are therefore also referred to as "guidance lines." By acquiring additional guidance lines near the center of k-space several times throughout the echo train, it is possible to estimate motion parameters at higher temporal resolution than the prior art methods, which are limited to estimating motion parameters once per echo train. The motion parameters may be rigid-body motion parameters, including, e.g., three translational and three rotational parameters, or non-rigid motion parameters. The guidance lines may provide sufficient spectral information to perform accurate motion estimation and retrospective motion correction, in particular using the SAMER technique disclosed in the above-cited article by D. Polak et al. By inserting more than one set of guidance lines into one echo train, intra-shot motion estimation is possible. For example, multiple sets of additional k-space lines may be inserted into the echo train, e.g. at the beginning, at the center and at the end of each echo train.

The MR image dataset acquired using the method may be used in retrospective motion correction, in particular using an "imaging+motion" or "SENSE+motion" model, as described in L. Cordero-Grande, Magn. Reson. Med., Vol. 79, no. 3, pp. 1365-1376, 2018, for example. The guidance lines may not be used to discard echo trains corrupted by motion, but to assist in the reconstruction of a retrospectively motion-corrected image.

The sets of additional k-space lines are acquired at pre-determined positions within the echo trains, wherein the positions may be distributed at least approximately evenly over the echo train, in order to provide a uniform temporal resolution. "At least approximately," when used in this disclosure, may mean within ±15% or ±10%. The additional k-space lines of each set may be acquired close in time, such as at least in part consecutively in time, or clustered. "Clustered" may mean that the additional k-space lines of one set are close in time, but not all of them are necessarily acquired directly one of after the other (consecutively). For example, in an MPRAGE sequence, each set of additional k-space lines may include two groups close in time, wherein each group has two consecutive k-space lines.

The imaging protocol may be any MR imaging protocol or sequence in which several k-space lines are acquired in each of a plurality of echo trains. An "echo train," also referred to as "shot," includes a plurality of MR echoes, e.g., spin echoes and/or gradient echoes. During each echo, a k-space line is acquired. An echo train may be acquired after a single preparation pulse, such as an inversion pulse. In most sequences, an echo train includes a preparation pulse, and then all echoes have their own excitation/refocusing pulses, except in echo-planar imaging. Thus, an echo train may mean a series of gradient echoes or spin echoes, each echo corresponding to one line in k-space, which may be acquired after a single preparation pulse (e.g., in MPRAGE) or without such preparation pulse (e.g., in steady state sequences), but still in one sequence within an MR imaging protocol.

The imaging protocol may be a turbo-spin-echo sequence or a gradient-echo sequence. It may be a non-steady-state sequence, e.g., one in which the signal intensity or contrast varies over the echo train in particular due to T1 and/or T2 relaxation, e.g. MPRAGE. An echo train may include one or several sub echo trains, wherein a separate image may be acquired in each sub echo train. For example, in MP2RAGE, each echo train includes two sub echo trains, so that the data for two images with different contrast are acquired, one in each sub echo train. Alternatively, the disclosure may be used on steady state sequences, such as gradient recalled echo (GRE).

The imaging protocol may be a two-dimensional (2D) or three-dimensional (3D) imaging protocol. In a 2D-imaging protocol, a slice of the object may be selected during RF excitation using a slice-select gradient. During each shot, the k-space plane is sampled by using a phase encode gradient along one dimension and a frequency encoding gradient along another spatial dimension. In a 3D-imaging protocol, a thick slab of tissue is excited together. In such 3D-imaging, spatial encoding may be performed using phase-encoding gradients along two spatial dimensions, also referred to as "phase-encode plane," and frequency encoding along the third spatial dimension, referred to as readout direction. Accordingly, with each MR echo, a k-space line oriented along the readout direction is sampled. By modifying the phase-encoding gradient before each readout, it is possible to design different sampling orders, e.g., the order in which the k-space lines are acquired in the phase-encode plane.

One k-space line may be acquired during one echo, and there may be 8 to 512 echoes in one echo train. For example, in three-dimensional (3D) turbo spin-echo sequences, there may be 64 to 512 echoes in one shot, in two-dimensional (2D) turbo spin-echo sequences, an echo train may contain less than 20 echoes. The imaging protocol may use a multi-shot method, in which a fraction of k-space is sampled in one shot. The imaging protocol may include, e.g., 5 to 300 shots, depending on whether it is 2D or 3D. Examples for such imaging protocols are fast spin-echo sequences, also termed SPACE ("sampling perfection with application of optimized contrast using flip angle evolution") or MPRAGE ("magnetization prepared rapid gradient echo"), which uses an inversion preparation followed by gradient echoes. 2D imaging protocol such as 2D Turbo Spin-Echo may also be used.

"Additional" means that the k-space lines are acquired in addition to those that are required under the imaging protocol to acquire an MR image, e.g., they are redundant when it comes to image reconstruction. However, they would be suitable to be used in reconstructing the MR image, because they are acquired under the same conditions, namely within the same echo train as the MR image data, e.g., having the same repetition time, echo time, contrast etc.

The method differs from known navigator techniques in that the guidance lines used for motion estimation are acquired as part of the echo train of the imaging sequence used, and thus do not lead to disruptions in the image acquisition. Navigators may require considerably more additional scan time (e.g., 100-200 ms) and thus inserting them multiple times throughout an echo train would substantially reduce scanning performance. In contrast to navigators, the sets of additional k-space lines are acquired in the same echo train as the rest of the image, e.g., they may be easily integrated into the echo train with minimal disruption of the imaging sequence and may not require additional preparation pulses.

Because the motion correction works well even with a very small number of additional k-space lines per set, e.g., 4 guidance lines, the additional scan time caused by the acquisition of the additional k-space lines is minimal, at maximum up to 10% or not more than 5%.

In an embodiment, the sets of additional k-space lines are only used for motion estimation. Alternatively, the sets of additional k-space lines may also be used for image reconstruction (e.g., the "imaging+motion", in particular "SENSE+motion" reconstruction). In certain embodiments, the sets of additional k-space lines are not used because they contain redundant information.

The method may be executed on any medical or other MRI apparatus. The object may be an MRI phantom or a part of the human or animal body, in particular part of a patient to be examined.

The sets of additional k-space lines are acquired at pre-determined (time) positions in the echo train, for example, one set at the beginning of the echo train, (e.g., the $1^{st}$, $2^{nd}$, $3^{rd}$, and $4^{th}$ echo), and one set in the middle of the echo train, (e.g., the $128^{th}$, $129^{th}$, $130^{th}$ and $131^{st}$ echo). However, any other position or echo number is possible. The sets of guidance lines may be acquired at regular intervals or at least approximately regular intervals during the acquisition of the MRI dataset, for example, every 200 to 2500 ms, every 300 ms to 1000 ms, or every 500 ms to 2000 ms, wherein "at least approximately" may mean within ±15%. This allows a good motion tracking.

In most embodiments, the sets of additional k-space lines are acquired in each of the echo trains. However, it is also possible to acquire them only in a subset of the echo trains, (e.g. in more than 85%, more than 90%, or more than 95% of the echo trains), so that some echo trains have no guidance lines. The range may be 85% to 100% or 90% to 99%.

The position in k-space of the additional k-space lines is within a central region of k-space because low-frequency k-space information better captures the effects of patient motion than information from the k-space periphery. In the phase-encode plane, (e.g., the plane spanned by the two phase-encode directions in 3D imaging), the central region may be a square, circle, or polygon centered on the center of k-space. The central region may be equivalent to a magnetic resonance image of low resolution, such as a scout image, in particular a low-resolution image having a pixel/voxel size of ≥3 mm or ≥4 mm, for example, 3-7 mm or 4-6 mm. The central k-space region covered by the additional k-space lines, also termed "calibration region," may not be too small, because the motion estimation error rises sharply when the extent of the calibration region is too far reduced. The calibration region may extend over the central 0.1% to 15% or over the central 0.5% to 5% of the overall k-space phase-encoding plane. In the case of three-dimensional imaging, the central calibration region may have the shape of a cylinder extending in readout direction. The cylinder cross-section, (e.g., its shape in the phase-encode plane), may be square or rectangular, honeycomb, or diamond-shaped. Thus, a set of additional k-space lines may correspond to a highly under-sampled low-resolution 3D image.

The method requires minimal modification of the imaging protocol and may be implemented in a variety of different imaging protocols, because it may be based on a standard clinical reordering scheme, where a small number of additional guidance lines may be included into the echo train. Especially in combination with a low-resolution scout scan, these samples enable very rapid and accurate motion estimation by comparing the data consistency error in an "imaging+motion" or "SENSE+motion" model with the guidance lines (additional k-space lines) from each shot. The method allows accurate motion estimation and at the same time minimizes adverse effects on image quality and sequence timings, because the additional guidance lines may be fully integrated into the echo train. By contrast, navigator techniques (e.g., vnavs) may rely on the acquisition of a separate EPI (echo-planar imaging) scan, or another low-resolution image, which may not be integrated into the echo train. Instead, they are played either before or after the standard data acquisition, which may be disruptive to the sequence timing. For example, in MPRAGE, the additional scan time needed for these navigators may increase the minimal inversion time which may affect the achievable contrast and image quality. Also, navigator techniques may rely on registering the low-resolution images with one another in the image domain and thereby estimating the motion trajectory. By contrast, in the disclosure, the guidance lines may be compared against a Scout image in k-space. In useful embodiments, the number of additional k-space lines acquired in one shot would not be sufficient to reconstruct an image and to estimate the motion trajectory in the image domain.

In an embodiment, the method further includes acquiring a low-resolution scout image of the object. This allows retrospective motion correction of the acquired image data using the SAMER method disclosed by D. Polak et al. in Magn. Reson. Med., vol. 87, pp. 163-178, 2022, the scout image may be used as the image estimate $\tilde{x}$ in the first act of the optimization, in which motion parameters $\hat{\theta}_i$ for each set of guidance lines are estimated using the "SENSE+motion" model on $\tilde{x}$ and comparing with the respective set of guidance lines $s_i$. Thereby, six rigid body motion parameters $\hat{\theta}_i$ may be estimated for each time point I corresponding to a set of guidance lines. In this first act, the acquired image data need not be used, only the Scout image and the additional k-space lines. In a second act of the image reconstruction, the motion parameters $\hat{\theta}$ are used to estimate the actual motion-corrected image from the acquired MR image data s, again using a "SENSE+motion" model.

The low-resolution scout images may have a spatial resolution in a range of 2-8 mm or in a range 3-5 mm, (e.g., 4 mm), in the phase-encode plane and may cover at least approximately the calibration region of k-space. The scout images may cover a slightly larger or slightly smaller region in k-space than the calibration region, (e.g., 70% to 150% or 80% to 130% of the calibration region), so that there is sufficient k-space overlap between the scout images and the calibration data. The scout images may be 2D or 3D images. The scout image may be acquired with the same or a different imaging protocol than the MR image data to be used for the motion-corrected image, for example, a turbo spine-echo (e.g. MPRAGE) or gradient-echo (e.g. FLAIR) sequence, e.g., with a high parallel imaging acceleration of, e.g., R=4-12. The scout image(s) may not be acquired as part of the MR imaging protocol, e.g., not in the same echo trains as the MR image data for the motion-corrected image. The Scouts may however be acquired without delay directly before or after the MR image data.

In an embodiment, the method includes acquiring a number (e.g., a plurality) of low-resolution scout images of the object, wherein the number of scout images may be the same as the number of sets of additional k-space lines acquired per echo train, or it may be smaller. In this embodiment, the scout images are acquired with a contrast corresponding to the pre-determined positions of the sets of additional k-space lines within the echo train. Thus, the k-space center of the scout images may be acquired using echoes which are at the same and/or approximately at the same (time) positions within the echo train as the corresponding set of guidance lines. In case the contrast differences are not dramatic, fewer scout images than the number of sets of additional k-space lines acquired per echo train may be sufficient. Alternatively, the contrast of the acquired scout image may be configured, e.g., by artificial intelligence, so that also fewer or only one scout image is sufficient. The scout images may all be acquired close in time to one another, e.g., either all before or at the beginning or all after or at the end of the imaging protocol, in order to avoid motion between them as much as possible. They may be acquired consecutively one after the other or interleaved with one another (but not with the MR image protocol).

In this embodiment, the acquired data may be reconstructed in a method similar to the SAMER-method, except that there are several scout images, wherein each scout image has a different contrast. In particular, the number of scout images may be equal to or smaller than the number of sets of additional k-space lines acquired per echo train, which may be 2 to 5, 2 to 4, or 2 or 3. This is advantageous in sequences where, due to relaxation, the signal amplitude varies significantly across the echo train, in particular all non-steady-state sequences such as in MPRAGE, TSE, or FLAIR. Therefore, the several sets of guidance lines per echo train will have different signal amplitudes, phases, and/or different contrasts, and if each set of guidance lines were compared against the same scout scan (as in the known SAMER motion optimization), this might lead to inaccurate motion estimates. In the embodiment with several scout images with contrasts corresponding to the several sets of guidance lines, each set of guidance lines may be compared against the corresponding scout image in the optimization, e.g., the scout image having the same or corresponding contrast. Thus, each set of guidance lines acquired in one echo train may be compared against a corresponding scout image that has been acquired at the same or similar position within an echo train. Motion parameters may be estimated through the "SENSE+motion" encoding forward model. In particular, the modelled synthetic k-space data may be compared against the acquired k-space guidance lines. If multiple sets of guidance lines are acquired, the scout image with the corresponding contrast may be fed to the SENSE+ motion model.

In an embodiment, two sets of additional k-space lines are acquired in each echo train or in each sub echo train, one in the first half and one in the second half of the echo train or sub echo train. The sets may be acquired in the beginning, in the middle, or at the end of each half, but may be at the same echo position, (e.g., the $10^{th}$, $11^{th}$, $12^{th}$, and $13^{th}$ echo of the first half, and the $10^{th}$, $11^{th}$, $12^{th}$, and $13^{th}$ echo of the second half). Thereby, the motion may be tracked at regular intervals. In certain examples, two scout images may also be acquired with contrasts corresponding to the positions of the two sets of guidance lines in the echo train.

In another embodiment, three sets of additional k-space lines are acquired in each echo train or sub echo train, one in the 1st third, one in the 2nd third, and one in the 3rd third of the echo train or sub echo train. The sets may be acquired in the beginning, in the middle, or at the end of each third. Thereby, the motion may be tracked with a high temporal resolution, thereby capturing fast movements such as heavy breathing. In certain examples, three scout images may also be acquired, with contrasts corresponding to the positions of the three sets of guidance lines in the echo train.

According to an embodiment, the position in the k-space of the additional k-space lines acquired in each echo train or sub echo train or in each of the subset of echo trains is constant or is varied slightly over the echo train or the subset of echo trains. This assures that the guidance lines may be used to estimate the motion between each time point in which they are acquired, by allowing comparison between them. The location of the additional k-space lines may be the same for each set. However, one may also slightly vary the location of the additional k-space lines, e.g., a variation by ±5% or ±2% of the extension of k-space.

According to an embodiment, 2-16 additional k-space lines or 4-8 additional k-space lines may be included in each set of additional k-space lines. It has been found that the sampling density within the central k-space region does not significantly affect the motion estimation accuracy. A surprisingly low number of additional k-space lines is sufficient to achieve accurate motion estimation. In an example, using only 4 guidance lines enabled accurate motion parameter estimation with negligible error. Evidently, it is beneficial to keep the number of additional k-space lines small, as these guidance lines are not required for the image reconstruction and thus increase the scan time.

According to an embodiment, the acquisition of the additional k-space lines takes up only 1% to 10% or 2% to 5% of the acquisition time of the respective echo train. The method thus may achieve motion correction at little expense of efficiency of the imaging sequence.

In an embodiment, the imaging protocol provides for sampling of k-space in a sampling order in which the one or several phase-encoding gradients are changed incrementally from one k-space line to the next, with the exception of the additional k-space lines. It has been shown that jumps in k-space, as used in a distributed reordering such as "checkered," where each shot acquires data in the k-space center that is used for both motion estimation and image reconstruction, lead to more severe manifestations of motion artefacts, which the "SENSE+motion" reconstruction may not be able to fully correct for. This is because, in such a reordering, motion leads to many small inconsistencies in the k-space center, even after correction. Therefore, in certain embodiments, k-space is sampled in a linear, spiral, or radial sampling order. In a linear reordering, the phase-encoding gradient(s) is/are increased incrementally or step-by-step for each k-space line, resulting in a sampling of k-space line-by-line, from one end of k-space to the other. The k-space lines may be straight k-space lines that are acquired one after the other in a radial, spiral or any other pattern, as viewed in the phase-encode plane.

In an embodiment, the imaging protocol uses a 3D parallel imaging technique, in which one or both of the phase encoding directions are subsampled by a predetermined acceleration factor, and the image dataset is acquired using a multi-channel coil array. Accordingly, the subsampling pattern may be incorporated into the forward model, e.g., a "SENSE+motion" model.

The disclosure also relates to a method for generating a motion-corrected MRI dataset of an object from k-space data acquired using the acquisition method as described herein. The method includes estimating the motion-corrected image dataset and motion parameters for each set of additional k-space lines by minimizing the data consistency error between the k-space data acquired in the imaging protocol and a forward model described by an encoding matrix, wherein the encoding matrix includes the effects of motion for each set of additional k-space lines, Fourier encoding, and optionally subsampling and/or coil sensitivities of a multi-channel coil array. In detail, the method includes receiving k-space data acquired using the acquisition method described herein, receiving at least one low-resolution scout image of the object. In a first act, motion parameters are estimated for each set of additional k-space lines by comparing the respective additional k-space lines with or against the at least one scout image. In a second act, the motion-corrected image dataset is estimated by minimizing the data consistency error between the k-space data acquired in the imaging protocol and a forward model described by an encoding matrix, wherein the encoding matrix includes the motion parameters for each set of additional k-space lines, Fourier encoding, and optionally subsampling and/or coil sensitivities of a multi-channel coil array (7.1, 7.2). The forward model may be the "SENSE+motion" model.

Thus, the minimization problem is carried out in two acts. In a first act, motion parameters (which may be rigid-body motion parameters or non-rigid motion parameters) are estimated for each set of guidance lines by comparison with the single scout image or the respective scout image having the corresponding contrast. The comparison of scout and guidance lines may use the same forward model, in particular, the "SENSE+motion" model, as the image reconstruction in the second act.

In a second act, the motion-corrected image is estimated using the motion parameters estimated in the first act. Thereby, alternating repeated updates of the otherwise coupled optimization variables x (image vector) and θ (motion parameters) is avoided. Rather, this embodiment uses the rapid scout image(s) as an image estimate x̃. This leads to a highly efficient optimization problem that is fully separable across the shots and does not require repeated updates of x, which may include millions of imaging voxels.

The additional k-space lines may not be used in the second act, in order to retain a reordering scheme in which k-space may be sampled such that the one or several phase encoding gradients are changed incrementally from one k-space line to the next. Such a reordering scheme has favorable properties in the "SENSE+motion" reconstruction.

All features disclosed with regard to the acquisition method may be combined with all features of the motion-correction method and vice versa. Also, all features of the disclosed methods may be embodied in the MRI apparatus, computer program and computer-readable storage medium according to other aspects of the disclosure and vice versa. The method for generating a motion-corrected MRI dataset may also be termed image reconstruction of the acquired MR data. The disclosure is also directed to a method of (both) acquiring and reconstructing an MRI dataset, as they may be performed one after the other.

The minimization problem may be derived from a SENSE parallel imaging forward model, as described in K. P. Pruessmann et al., "SENSE: sensitivity encoding for fast MRI," Magn. Reson. Med., vol. 42, no. 5, pp. 952-962, 1999, with (rigid-body) motion parameters included ("SENSE+motion").

According to an embodiment, the method includes a further act of receiving a number of low-resolution scout images of the object, wherein the scout images have a contrast corresponding (at least approximately) to the predetermined positions of the sets of additional k-space lines within the echo train. "At least approximately" may mean that the scout images are acquired at similar positions (e.g., ±15% or ±10%) within the echo train, compared to the sets of guidance lines. In this embodiment, the estimation act may be carried out using a method similar to the SAMER technique (Magn. Reson. Med., pp. 163-178, 2022). Thereby, the several low-resolution scout images may be used in the retrospective motion correction in combination with the sets of additional k-space lines in order to completely avoid time-consuming joint optimization of motion and image vector. This aspect of the disclosure allows each motion state to be independently determined using fully separable motion optimizations across all guidance lines. For the final image reconstruction, the individual motion states from each echo train may be combined and a standard least squares problem may be solved to obtain a motion-mitigated or motion-corrected image.

According to an embodiment, the motion parameters estimated for each set of additional k-space lines may be interpolated in order to obtain an improved estimate of motion parameters for each k-space line of the acquired MR image data. In other words, the estimated intra-shot motion parameters may be interpolated temporally to obtain continuous tracking data across the entire shot. The estimated intra-shot motion parameters may be interpolated to any desired degree of temporal resolution. For example, an individual motion state may be calculated for each echo/k-space line. There is a tradeoff between image accuracy and computation time, because the computational cost of the final image reconstruction will scale linearly as a function of interpolated motion states.

According to an embodiment, the reconstruction method includes the additional act of determining redundancies across the motion parameters, by forming groups of motion parameters, such that each group contains motion parameters that are similar to each other, and dividing the k-space data into bins, wherein each bin corresponds to a group of motion parameters. This is also termed "compression," as it combines physical motion states with similar motion parameters into "bins." In the following, the term "motion state" is used for one set of "motion parameters" corresponding to one point in time, as determined, e.g., by a set of guidance lines. The acquired k-space data may be divided into these bins, so that the data in each bin has a similar motion state. This reduces the computational burden of intra-shot motion correction during the final image reconstruction. In an embodiment, the data in each bin may be treated as if it had been acquired in the exact same motion state, which may be an average of the group of motion states. This is done in the act of estimating the motion-corrected image dataset by minimizing the data consistency error between the k-space data acquired in the imaging protocol and a forward model described by an encoding matrix. In other words, the groups of redundant motion states may be treated as one single motion state during the reconstruction of the MR image from the k-space data, in particular, in the second act described above.

Redundancies across the motion states may arise when motion states do not change or change only minimally in between shots, or when motion states reappear periodically due to periodic movement of the subject. Compressing the plurality of motion states may include reducing the number of motion states, in particular, by excluding redundant/ highly similar motion states. Advantageously, while the reconstruction time may be decreased substantially with compression, a similar image quality may be retained as obtained from a full reconstruction.

The redundancies across the motion states may be determined by finding similarities between different motion states, e.g. by comparing the motion parameters of different motion states with each other and finding a redundancy if the differences are below a predetermined threshold. Similarities may correspond to similar motion parameters, in particular describing translational (e.g., in mm) and/or rotational (e.g., in degree or "°") movement. The predetermined threshold may be a variable to adjust the level of compression. Accordingly, the threshold may be chosen to be as low as needed in order to achieve a desired accuracy, in particular with regard to a required model accuracy and/or a level of acceptable occurring artefacts. The threshold may be set in relation to a voxel size of the reconstructed image. The threshold may be 10% to 80%, 20% to 60%, or 30% to 50% of the Voxel size. The Voxel size may be about 1 mm in the case of a 3D image or about 0.5 mm in the case of a 2D image. Comparable values may be chosen for the rotational parameters, e.g., the threshold may be set to be in a range of 0.1° to 0.8°, in a range of 0.2° to 0.5°, or about 0.3°.

Compressing the plurality of motion states may include forming groups of motion states, such that each group contains motion states that are similar to each other with respect to their motion parameters, in particular by comparing the motion parameters of different shots, (e.g., all shots), to each other. Grouping may thus be performed based on an estimated physical motion trajectory as defined by the motion parameters. The similarities may be determined by using the above-described threshold. The motion states of each one group may be combined into a single motion state, in particular such that the number of compressed motion states across all groups is lower than the number of original motion states. A new motion state with new motion parameters may be assigned to each group. e.g., by computing the mean motion across the motion states of every group.

To facilitate intra-shot motion estimation and correction using SAMER, the method provides center of k-space information at multiple time points throughout the shot or temporally adjacent shots. The proposed method enables motion estimation and correction at higher temporal resolution and thus overcomes residual artifacts may be seen in standard methods due to the small temporal resolution at which the patient's motion is tracked.

In a further aspect, a magnetic resonance imaging apparatus is provided which includes a radio frequency controller configured to drive an RF-coil, e.g., including a multi-channel coil-array, a gradient controller configured to control gradient coils, and a control unit configured to control the radio frequency controller and the gradient controller to execute the imaging protocol. The MRI-apparatus may be a commercially available MRI-apparatus which has been programmed to perform the method. For example, it may be 3T scanner like the MAGNETOM Vida of SIEMENS Healthcare, Erlangen, Germany. A multi-channel coil array may for example be a 32-channel head coil but may also be a coil array for spine-imaging.

According to a further aspect, a computer configured to generate a motion-corrected magnetic resonance image dataset is provided. The computer includes an interface configured to receive k-space data and scout images acquired in a multi-shot imaging protocol, in particular according to the acquisition method described herein. The computer further includes a processor configured to estimate the motion-corrected image dataset and motion parameters for each set of additional k-space lines by minimizing the data consistency error between the k-space data acquired in the imaging protocol and a forward model described by an encoding matrix, wherein the encoding matrix includes the effects of motion for each set of additional k-space lines, Fourier encoding, and optionally subsampling and/or coil sensitivities of a multi-channel coil array.

The computer may be any computer including a sufficiently powerful processor, which may be a CPU or GPU, or several such processors. Accordingly, the computer may be a PC, a server, or a console of an MRI apparatus, but it also may be a computer that is remote from the MRI apparatus (e.g., the computer may be connected with the MRI apparatus through the Internet). Accordingly, the computer may also be a cloud computer, a remote server, etc. The computer may also be a mobile device, such as a laptop, tablet computer, or mobile phone.

According to a further aspect, a computer program is provided which includes program code, which causes a magnetic resonance imaging apparatus (e.g., such as the apparatus described herein) to execute the method, in particular the method for acquiring an MR image dataset. However, the program code may also encode the described method for generating a motion-corrected magnetic resonance image dataset, and which program code may run on a computer as described herein.

According to a further aspect, the disclosure is directed to a non-transitory computer-readable medium containing a computer program as described herein. The computer-readable medium may be any digital storage medium, such as a hard disc, a cloud, an optical medium such as a CD or DVD, a memory card such as a compact flash, memory stick, a USB-stick, multimedia stick, secure digital memory card (SD), etc.

BRIEF DESCRIPTION OF THE DRAWINGS

The accompanying drawings illustrate various example methods and other example embodiments of various aspects of the disclosure.

Similar elements are designated with the same reference signs in the drawings.

DETAILED DESCRIPTION

Figure 1:
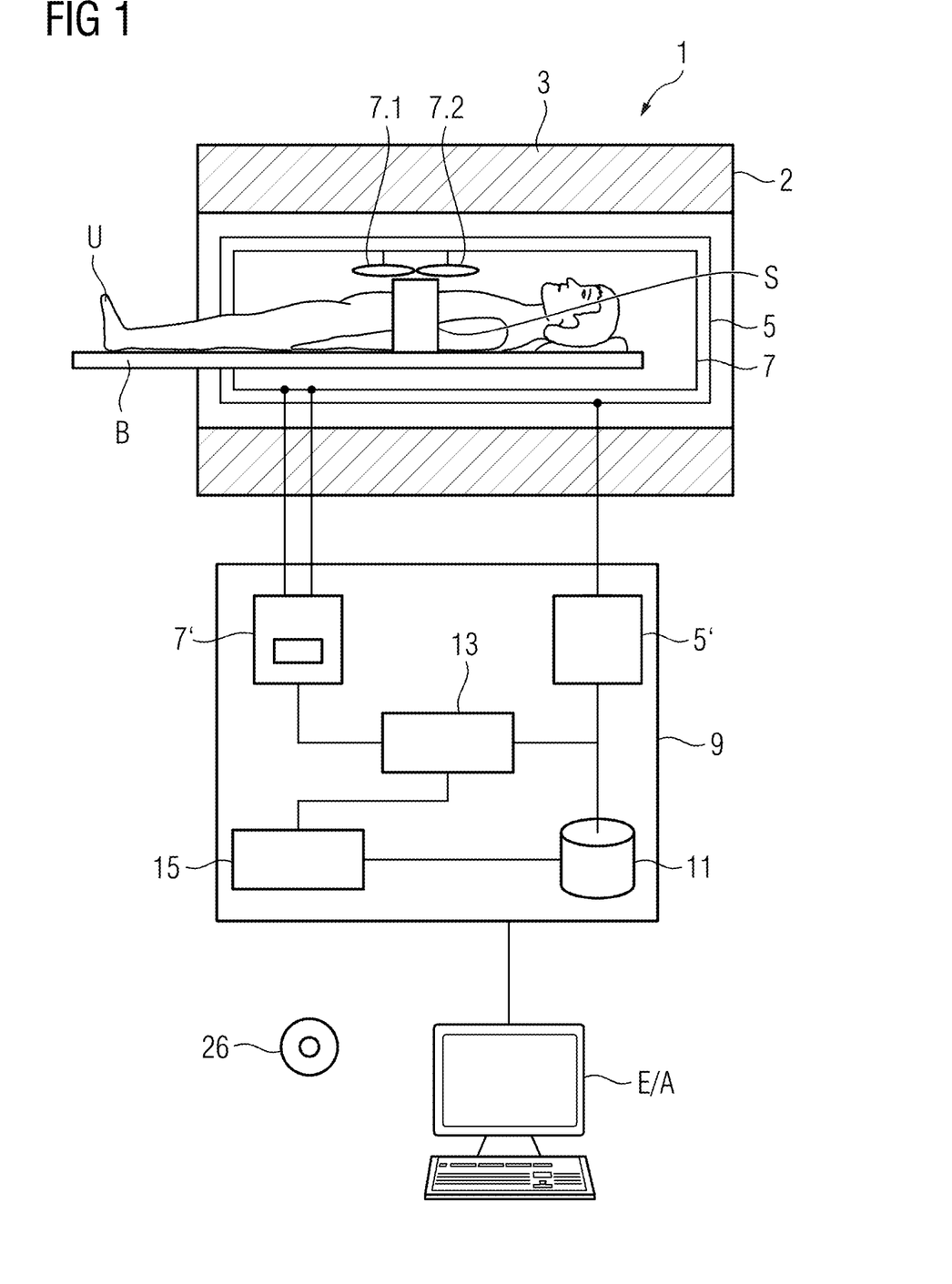
FIG. 1 is a schematic representation of an MRI apparatus according to an embodiment.

FIG. 1 schematically shows a magnetic resonance (MR) apparatus 1. The MR apparatus 1 has an MR data acquisition scanner 2 with a magnet 3 that generates the constant magnetic field, a gradient coil arrangement 5 that generates the gradient fields, one or several radio-frequency (RF) antennas 7 for radiating and receiving RF signals, and a control computer 9 configured to perform the method. The radio-frequency antennas 7 may include a multi-channel coil array including at least two coils, for example the schematically shown coils 7.1 and 7.2, which may be configured to transmit and/or receive RF signals (MR signals).

In order to acquire MR data from an examination object U, (e.g., a patient or a phantom), the examination object U is introduced on a bed B into the measurement volume of the scanner 2. The slab S is an example of a 3D slab of the examination object, from which MR data may be acquired using a method according to an embodiment. The control computer 9 controls the MR apparatus 1 and may control the gradient coil arrangement 5 with a gradient controller 5' and the RF antenna 7 with a RF transmit/receive controller 7'. The RF antenna 7 has multiple channels corresponding to the multiple coils 7.1, 7.2 of the coil arrays, in which signals may be transmitted or received. The control computer 9 also has an imaging protocol processor 15 that determines the imaging protocol, including the reordering pattern. A control unit 13 of the control computer 9 is configured to execute all the controls and computation operations required for acquisitions. Intermediate results and final results required for this purpose or determined in the process may be stored in a memory 11 of the control computer 9. A user may enter control commands and/or view displayed results, (e.g., image data), via an input/output interface E/A. A non-transitory data storage medium 26 may be loaded into the control computer 9 and may be encoded with programming instructions (program code) that cause the control computer 9, and the various functional units thereof described above, to implement any or all embodiments of the method.

Figure 2:
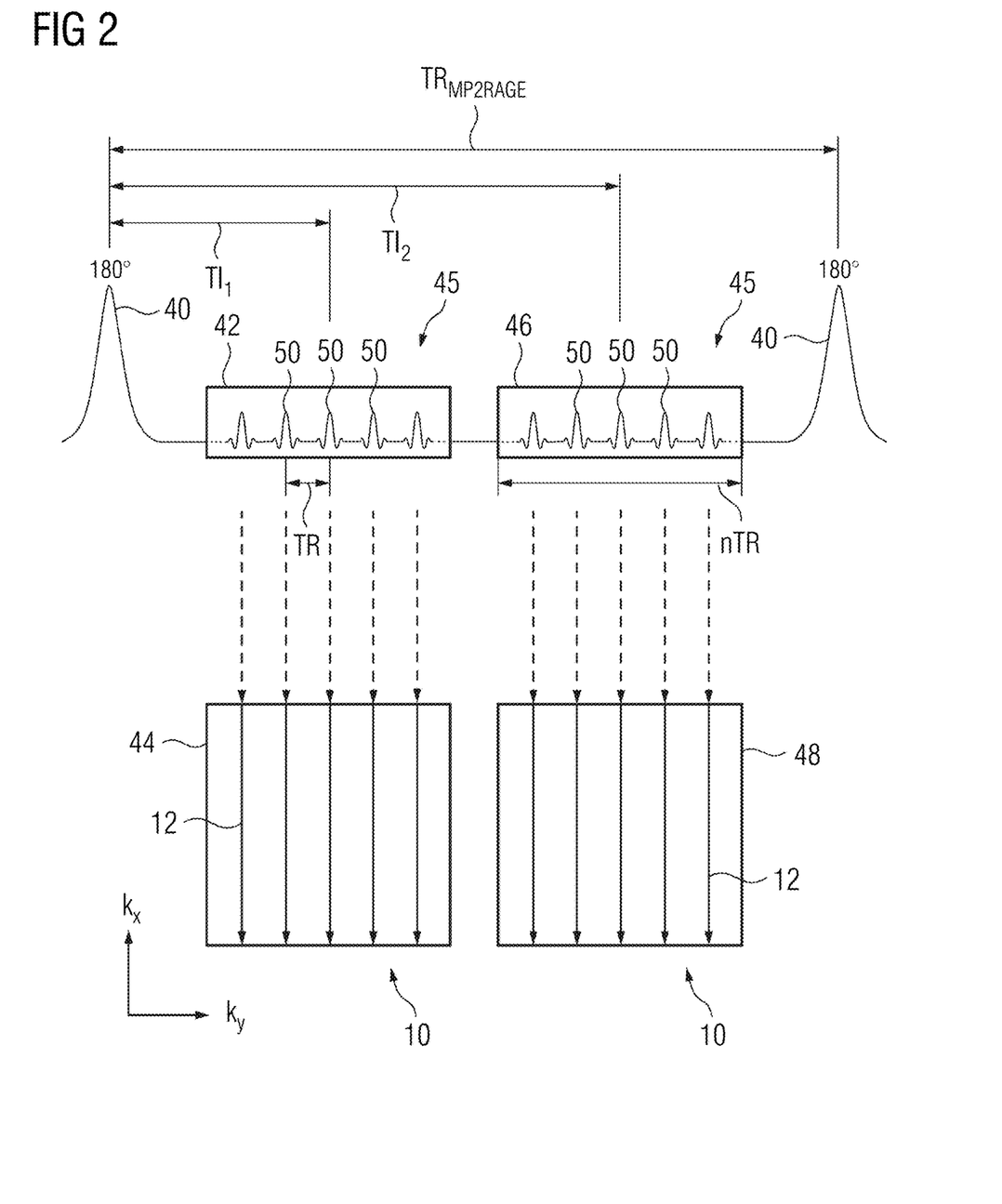
FIG. 2 is an example of a sequence diagram of a MP2RAGE imaging protocol.

FIG. 2 shows a sequence diagram illustrating an MP2RAGE sequence, which is an imaging protocol in which the additional set of k-space lines may be used to advantage. The sequence has a 180° inversion pulse 40 followed by an echo train 45 of gradient echoes 50. The gradients (not shown) include phase-encode gradients and readout gradients, as known in the art. Each of the echoes 50 is used to acquire one k-space line 12 in the k-space 10. However, in MP2RAGE, the echo train 45 is divided into a first part or sub echo train 42, which is used to acquire a first image 44, and a second part or sub-echo train 46, which is used to acquire a second image 48. Thus, each echo 50 in the first part 42 of the echo train 45 is used to acquire one k-space line 12 in the first image, and each echo 50 in the second part 46 is used to acquire one k-space line 12 in the second image 48. After $TR_{MPRAGE}$, a new inversion pulse 40 is played out and further k-space lines 12 are acquired in each image. The two images 44, 48 have quite different contrast, as the center of k-space of each image 44, 48 is acquired at a different TI, namely $TI_1$ and $TI_2$.

Figure 3:
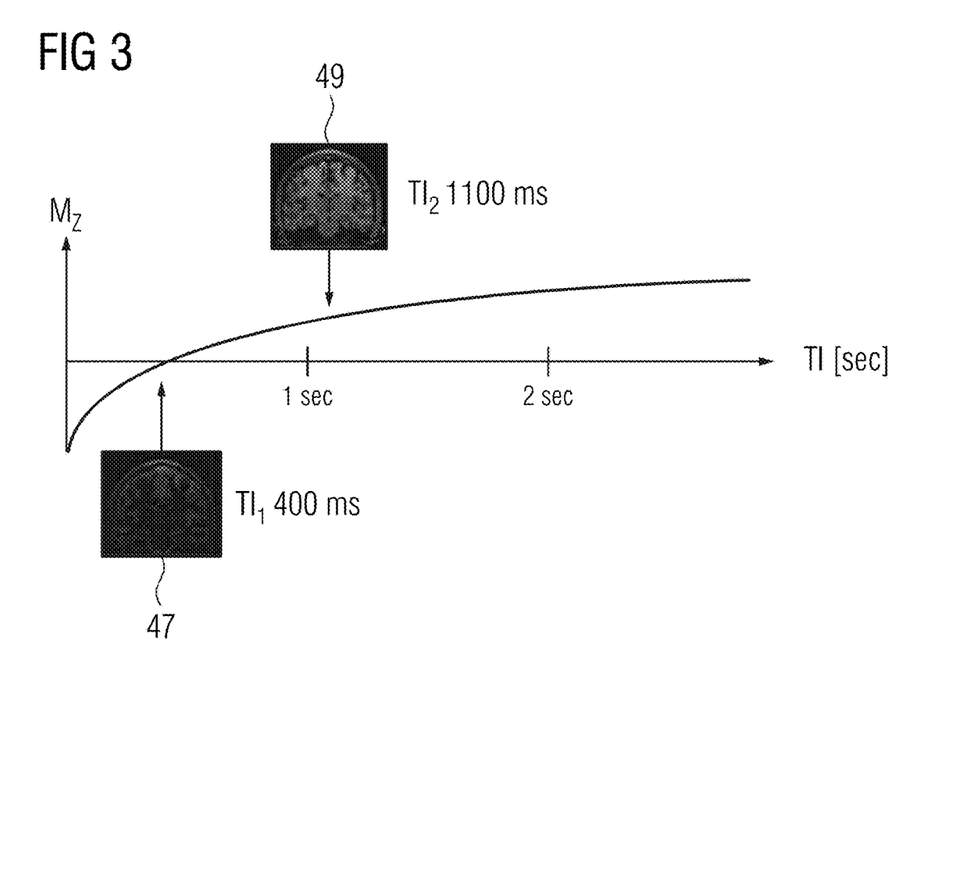
FIG. 3 is an example of a graph of average signal intensity vs. inversion time in an MPRAGE sequence.

This is further illustrated in FIG. 3, which shows the signal modulation across an echo train in MPRAGE, in particular two images 47 and 49, acquired at different inversion times TI. The images 47/49 may also be acquired with an MP2RAGE sequence and thus correspond to the k-space images 44 and 48 of FIG. 2. Due to T1 relaxation, the contrast differs for image 47 acquired at $TI_1\sim400$ ms and image 49 acquired at $TI_2\sim1100$ ms. According to an embodiment, guidance lines may be acquired for example at about $TI_1$ and $TI_2$. This is particularly advantageous, so that each of the two images 47, 49 may be assigned its motion state, e.g., a set of motion parameters. To achieve accurate motion estimation using SAMER, it is advantageous to acquire two corresponding scout scans with matching contrast.

Figure 4:
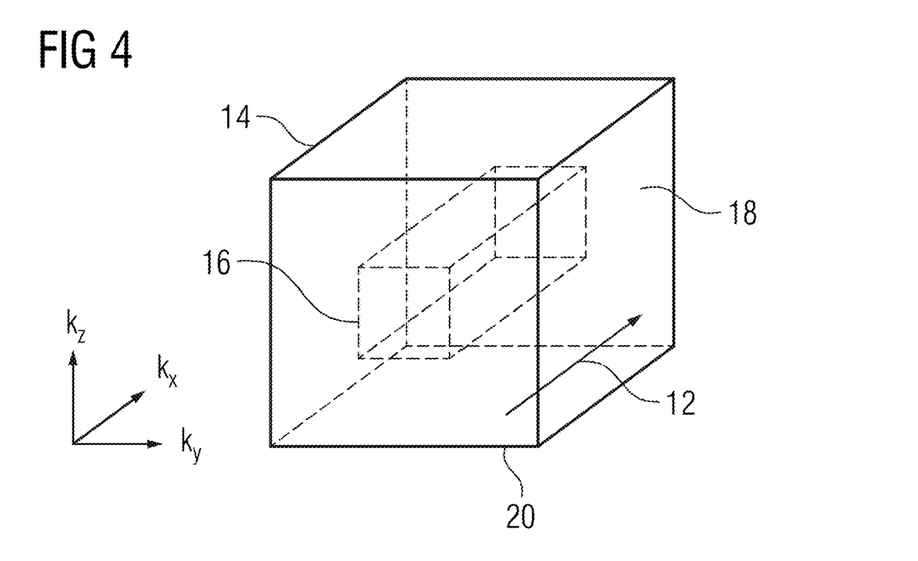
FIG. 4 is an example of a schematic representation of three-dimensional k-space.

In a 3D acquisition, phase encoding is performed in two spatial directions, leading to a distribution of k-space lines 12 across a volume, rather than a plane. FIG. 4 illustrates such three-dimensional k-space 14 having directions $k_x$ in readout direction, and $k_y$ and $k_z$ in the phase encode plane 20. A k-space line acquired during one echo is illustrated at 12. The k-space volume 14 is divided into a calibration region 16 and a periphery 18. Because the full acquisition in readout direction does not cost additional imaging time, the calibration region 16 may extend along the full length of the volume in readout direction $k_x$. However, in the phase encode plane 20, which in this illustration is oriented in the plane of the paper, the calibration region 16 covers only about ¹⁄₁₂ to ¹⁄₁₆ in each direction, e.g., less than ¹⁄₁₀₀ of the total square phase encode plane 20. The illustrated k-space line 12 is in the periphery 18.

Figure 5:
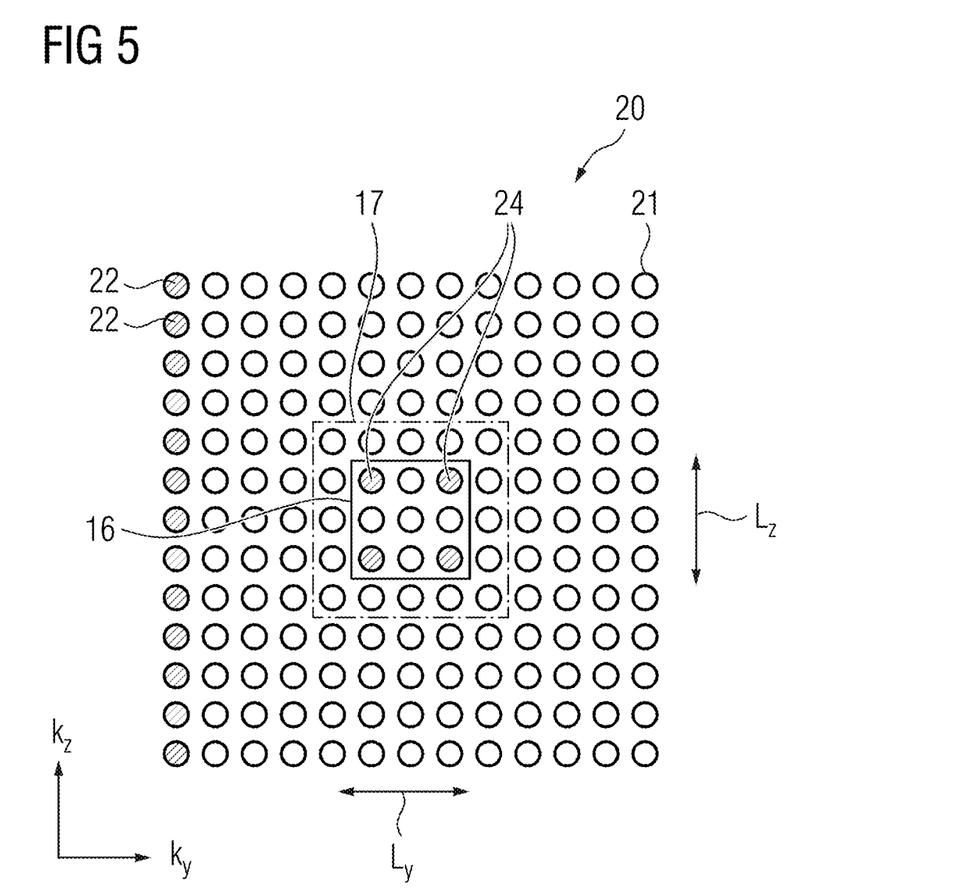
FIG. 5 is an example of a schematic representation of a phase-encode plane.

FIG. 5 shows a schematic plan view of the phase-encode plane 20 with each k-space line represented by one circle 21. The filled circles 22, 24 illustrate all k-space lines acquired in one shot. According to the imaging protocol, a linear echo train 22 is acquired, thereby sampling all k-space lines along one column in $k_z$ direction. In the same echo train, several additional k-space lines 24 are acquired from within the calibration region 16, which in this illustrative example has an extent of $L_y \times L_z = 3 \times 3$ in the phase-encode plane, of which 4 lines 24 are sampled. The calibration region 16 is slightly smaller than the scout region 17, which is the region in k-space covered by the low-resolution scout images. In embodiments, the set of k-space lines 24 are not acquired once, but several times per shot, for example at positions in the echo train corresponding to two different Inversion times.

Figure 6:
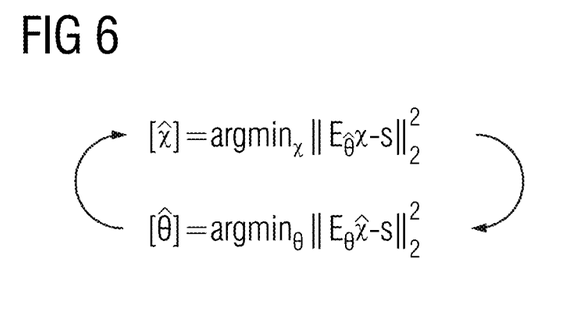
FIG. 6 is an example of an illustration of an alternating optimization algorithm.

A retrospective motion correction technique which may be used on the MR signals acquired with the acquisition method is now described with reference to FIGS. 6 and 7. The mathematical model used is an extension of SENSE parallel imaging, as described in the above-cited paper by K. P. Pruessmann et al., with rigid-body motion parameters included into the forward model (SENSE+motion). The forward model or encoding operator $E_\theta$ for a given patient motion vector θ (including motion parameters over time) relates the motion-free image x to the acquired multi-channel k-space data s. At each time point i that is considered, e.g. the acquisition time of the sets of guidance lines, the subject's position is described by a new set of six rigid-body motion parameters $\theta_i$ that describe the 3D position of the object. Accordingly, the multi-channel k-space data $s_i$ acquired at time point i may be related to the 3D image volume x through image rotations $R_i$, image translations $T_i$, coil sensitivity maps C, Fourier operator F and under-sampling mask $M_i$ by the following formula 1:

$$s_i = E_{\theta_i} x = M_i F C T_{\theta_i} R_{\theta_i} x \qquad [1]$$

This is a possible representation of the "SENSE+motion" model. In prior art methods, as illustrated in FIG. 6, both the motion corrected image vector x and the motion vector (trajectory) θ are estimated by performing an alternating, repeated optimization between the image vector (formula 2) and the motion vector (formula 3):

$$[\hat{x}] = \mathrm{argmin}_x \|E_{\hat{\theta}} x - s\|_2 \qquad [2]$$

$$[\hat{\theta}] = \mathrm{argmin}_\theta \|E_\theta \hat{x} - s\|_2 \qquad [3]$$

This may lead to convergence issues as updates of x and θ will be computed on inaccurate information. Moreover, the reconstruction is computationally demanding as repeated updates of x (millions of imaging voxels) are needed.

Figure 7:
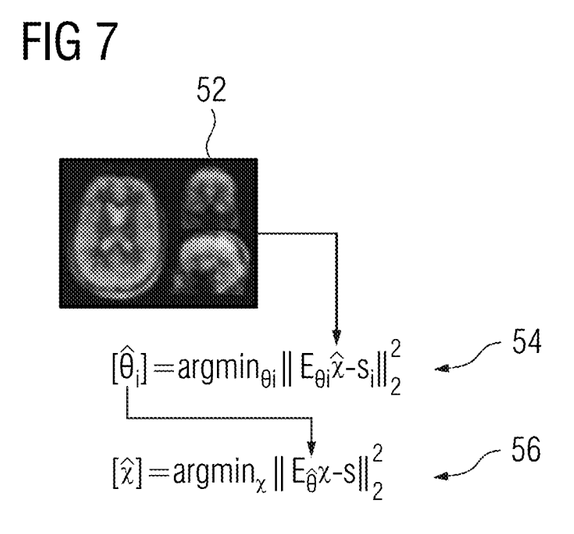
FIG. 7 is an example of an illustration of a SAMER optimization.

Using one or several ultra-fast low-resolution scout scans 52, the motion trajectory may be directly estimated, as illustrated in FIG. 7, thus avoiding the time-consuming alternate optimization. The scout image 52, designated by $\tilde{x}$, approximates the motion-free image volume $\hat{x}$ and each motion state may be determined independently by minimizing the data consistency error of the forward model:

$$[\hat{\theta}_i] = \mathrm{argmin}_{\theta_i} \|E_{\theta_i} \tilde{x} - s_i\|_2 \qquad [4]$$

In the method, the guidance lines $s_i$ may be used instead of or in addition to the k-space data s in this first act of the optimization. In certain examples, only the guidance lines are used. Where several scout images are acquired, the scout image $\tilde{x}$ having the same contrast as the respective guidance lines may be used for the estimation of the motion parameters θ relating to the time points of those guidance lines. In an embodiment, the intra-shot patient motion may be estimated from the calibration data by repeating the SAMER optimization for each set of guidance lines separately. Alternatively, a joint optimization across all calibration data may be performed, whereby the time of acquisition of each calibration sample is taken into account.

For the final image reconstruction, the intra-shot motion states from each shot are combined and the motion-mitigated image is obtained from solving a standard least-squares problem:

$$[\hat{x}] = \mathrm{argmin}_x \|E_{\hat{\theta}} x - s\|_2 \qquad [5]$$

This strategy completely avoids the difficult non-linear and non-convex joint optimization that contains millions of unknowns, as it only considers six rigid body parameters per motion optimization, and it does not require computationally costly full or partial updates to the image.

This framework may also be extended to Wave-CAIPI encoding. This method exploits available information in modern multi-channel receivers and may provide up to R=9-fold speedup for many important clinical contrasts. The sinusoidal gradients in Wave-encoding lead to a spatially varying phase that is applied along the read-out in hybrid space. Using the notation from the encoding model of formula [1]:

$$E_{\theta_i} = M_i F_{y,z} P_{yz} F_x C T_{\theta_i} R_{\theta_i} \qquad [6]$$

where the Fourier transform has been modified to contain the Wave point-spread-function $P_{yz}$.

Figure 8:
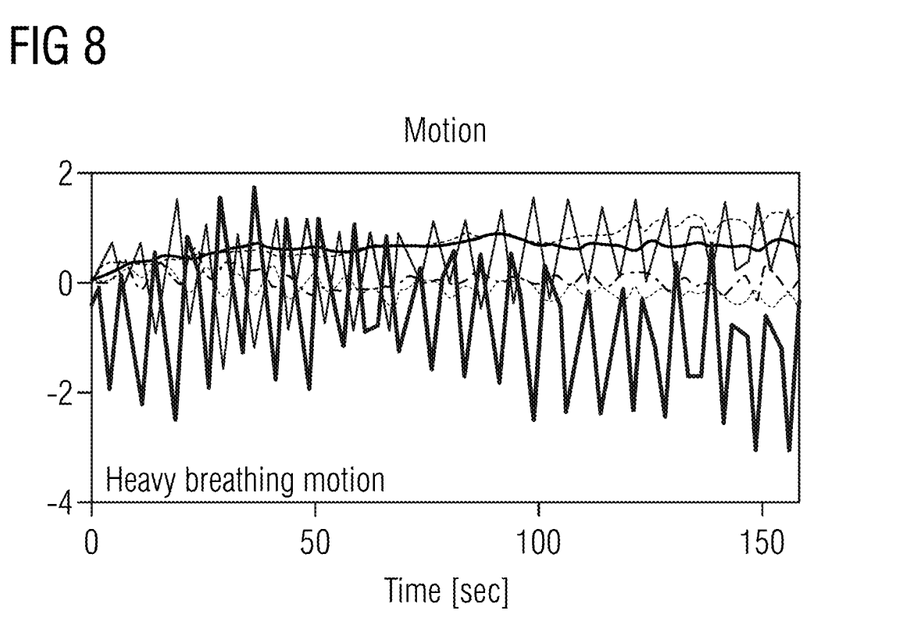
FIG. 8 is an example of a graph of a motion trajectory during heavy breathing motion.
Figure 9:
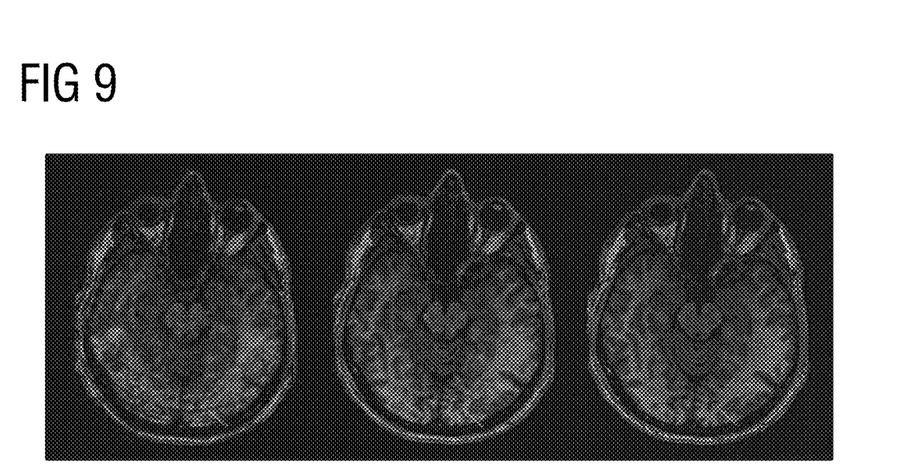
FIG. 9 depicts examples of MR images first without motion correction, and second with correction using guidance lines at a temporal resolution of 2.5 sec, and at a temporal resolution of 0.5 sec.

The method has been tested for heavy breathing motion, as shown in FIG. 8. FIG. 9 shows on the left an image with no motion correction. Motion correction at moderate temporal resolution (e.g., 2.5 sec), as shown in the middle, corrects for most motion artefacts, but the high temporal rate at which the patient moved does not fully mitigate all motion artefacts yielding loss of spatial resolution (c.f. arrow). Intra-shot motion estimation and correction (e.g., temporal resolution 0.5 sec) better represents the patient's motion trajectory which further improved the image quality after motion correction, as shown on the right.

Figure 10:
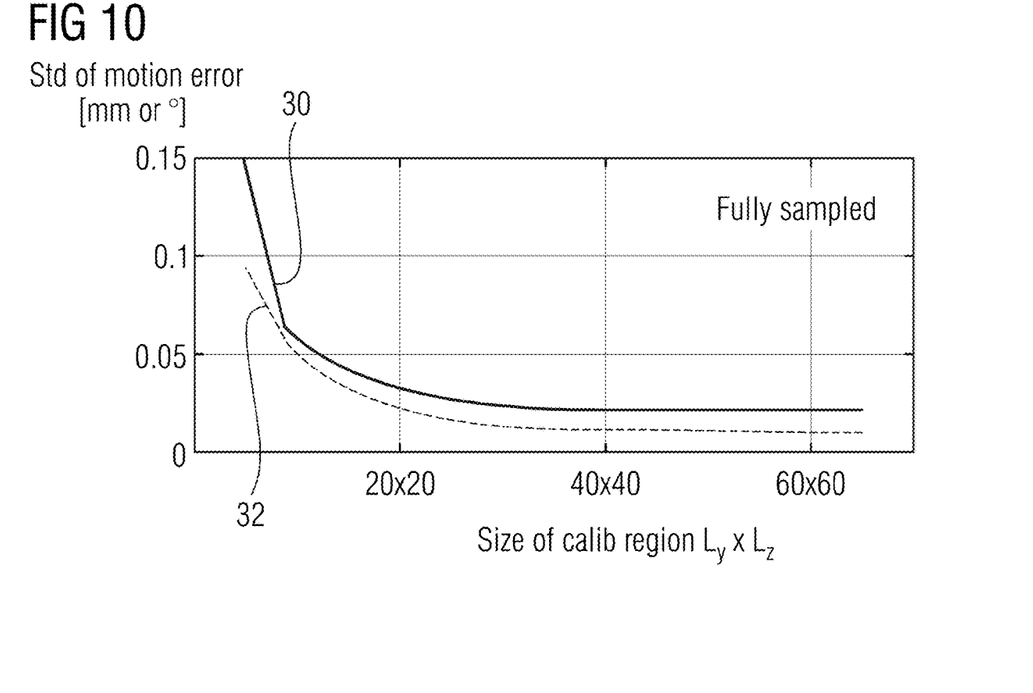
FIG. 10 is an example of a graph of motion estimation error vs. size of calibration region.

In FIG. 10, the standard deviation Std of the motion error for translational movement 32 (in mm) or rotational movement 30 (in °) is illustrated depending on the size of the calibration region 16, in number of samples. These data were obtained using two motion-free MPRAGE scans, which were combined to construct motion data sets which mimicked a single movement from the first to the second motion state in the middle of the imaging protocol, and wherein the movement included translational and rotational motion. The MPRAGE scans were combined to reconstruct k-space data with various sizes of the calibration region, as well as sampling density in the calibration region, see FIG. 11.

Figure 11:
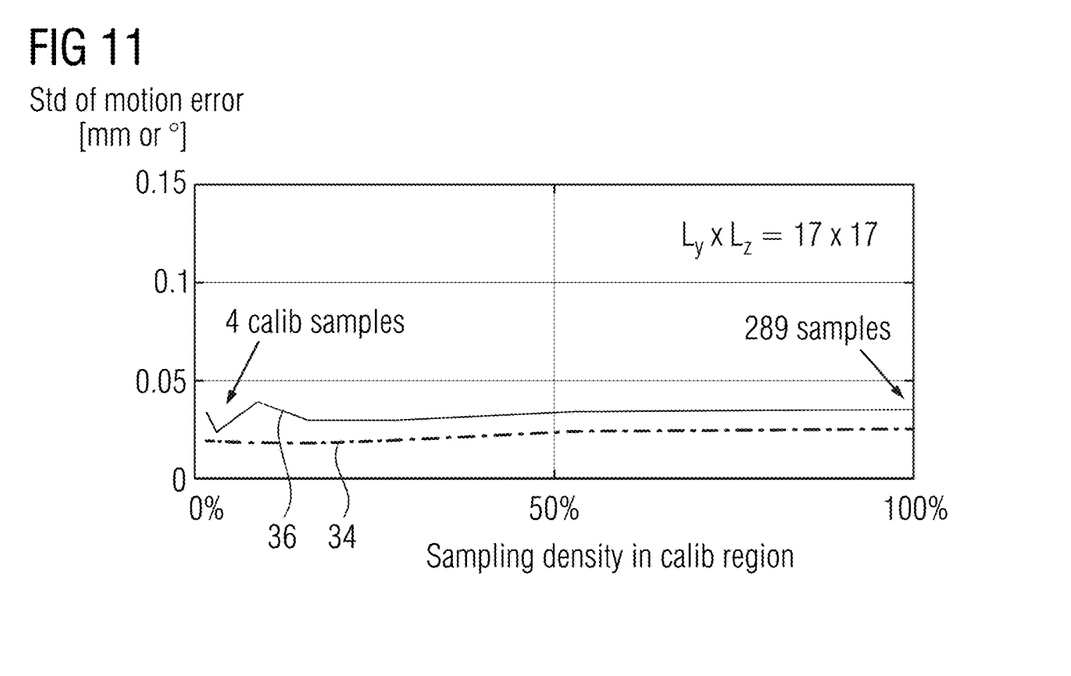
FIG. 11 is an example of a graph of calibration error vs. sampling density in the calibration region.

FIG. 11 shows the standard deviation of the motion error (translational 34 and rotational 36) for a fixed size of the calibration region of $L_y \times L_z = 17 \times 17$ so that a maximum number of 289 additional k-space lines may be acquired within the calibration region. The overall size of the data set was 256×256 k-space lines in the phase-encode plane. As one may take from FIG. 10, both the rotational error 30 as well as the translational error 32 increased sharply when the size of the calibration region was reduced to below 10×10. However, an increase beyond 20×20 and in particular 30×30 gave little further improvement. As one may take from FIG. 11, the standard deviation of the motion error was remarkable independent of the sampling density, and even a small number of only 4 guidance lines within the calibration region gave good results. Thus, a sampling density in a range of 1% to 3.33% or in a range of 1.33% to 2%, corresponding to an acceleration factor in a range of 30 to 100 or in a range of 50 to 75, may be used in the method.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for acquiring a magnetic resonance image dataset of an object, the method comprising:
using an imaging protocol in which spatial encoding is performed using phase encoding gradients along at least one spatial dimension, and frequency encoding gradients along another spatial dimension, wherein k-space is sampled during an acquisition in a plurality of k-space lines oriented along a frequency encoding direction;
acquiring several k-space lines in one echo train, wherein the imaging protocol comprises a plurality of echo trains; and
acquiring at least one set of additional k-space lines within a central region of the k-space a plurality of times per echo train in more than 85% of the plurality of echo trains, wherein the at least one set of additional k-space lines is acquired in addition to k-space lines required under the imaging protocol to acquire the magnetic resonance image dataset,
wherein each set of additional k-space lines of the at least one set of additional k-space lines is acquired at a pre-determined position within the plurality of echo trains.

2. The method of claim 1, wherein at least one echo train of the plurality of echo trains comprises at least one sub echo train.

3. The method of claim 1, further comprising:
acquiring at least one low-resolution scout image of the object.

4. The method of claim 3, wherein the at least one low-resolution scout image comprises a plurality of low-resolution scout images,
wherein a number of the plurality of low-resolution scout images is a same number or a smaller number than a number of sets of additional k-space lines acquired per echo train,
wherein the plurality of low-resolution scout images is acquired with a contrast corresponding to pre-determined positions of the sets of additional k-space lines within the echo train.

5. The method of claim 1, wherein two sets of additional k-space lines are acquired in each echo train or each sub echo train, and
wherein a first set of the two sets of additional k-space lines is acquired in a first half of each echo train or each sub echo train and a second set of the two sets of additional k-space lines is acquired in a second half of each echo train or each sub echo train.

6. The method of claim 1, wherein three sets of additional k-space lines are acquired in each echo train or each sub echo train, and
wherein a first set of the three sets of additional k-space lines is acquired in a $1^{st}$ third half of each echo train or each sub echo train, a second set of the three sets of additional k-space lines is acquired in a $2^{nd}$ third of each echo train or each sub echo train, and a third set of the three sets of additional k-space lines is acquired in a $3^{rd}$ third of each echo train or each sub echo train.

7. The method of claim 1, wherein the pre-determined position in the k-space of the additional k-space lines in each set of additional k-space lines is constant or is varied slightly for each set of additional k-space lines within ±5% of an extension of the k-space.

8. The method of claim 1, wherein 2 to 16 additional k-space lines are acquired in each set of additional k-space lines.

9. The method of claim 1, wherein the k-space is sampled in a sampling order in which the one or several phase encoding gradients are changed incrementally from one k-space line to a next k-space line, with an exception of the additional k-space lines.

10. The method of claim 1, wherein the imaging protocol uses a parallel imaging technique in which one phase encoding direction or all phase encoding directions are subsampled by a predetermined acceleration factor, and
wherein the magnetic resonance image dataset is acquired using a multi-channel coil array.

11. A method for generating a motion-corrected magnetic resonance image dataset of an object, the method comprising:
receiving k-space data acquired using an acquisition method, the acquisition method comprising:
using an imaging protocol in which spatial encoding is performed using phase encoding gradients along at least one spatial dimension, and frequency encoding gradients along another spatial dimension, wherein k-space is sampled during an acquisition in a plurality of k-space lines oriented along a frequency encoding direction;
acquiring several k-space lines in one echo train, wherein the imaging protocol comprises a plurality of echo trains; and
acquiring at least one set of additional k-space lines within a central region of the k-space a plurality of times per echo train in more than 85% of the echo trains, wherein the additional k-space lines are acquired in addition to k-space lines required under the imaging protocol to acquire a magnetic resonance image dataset,
wherein each set of additional k-space lines of the at least one set of additional k-space lines is acquired at a pre-determined position within the plurality of echo trains;
receiving at least one low-resolution scout image of the object;
estimating motion parameters for each set of additional k-space lines by comparing the respective additional k-space lines with the at least one low-resolution scout image; and
estimating the motion-corrected magnetic resonance image dataset by minimizing a data consistency error between the k-space data acquired in the imaging protocol and a forward model described by an encoding matrix, wherein the encoding matrix includes the motion parameters for each set of additional k-space lines, Fourier encoding, and optionally subsampling and/or coil sensitivities of a multi-channel coil array.

12. The method of claim 11, wherein the receiving of the at least one low-resolution scout image of the object comprises receiving a plurality of low-resolution scout images of the object, wherein each scout image of the at least one low-resolution scout image has a contrast corresponding to the pre-determined positions of the at least one set of additional k-space lines within the plurality of echo trains, wherein the minimizing of the data consistency error is executed by:
- (1) estimating the motion parameters for each set of additional k-space lines by comparing the respective additional k-space lines with the respective low-resolution scout image corresponding to a same position within the echo train as the set of additional k-space lines; and
- (2) estimating the motion-corrected magnetic resonance image dataset using the estimated motion parameters.

13. The method of claim 12, further comprising:
interpolating between the motion parameters estimated for each set of additional k-space lines to obtain an improved estimate of the motion parameters at a higher temporal resolution.

14. The method of claim 11, further comprising:
interpolating between the motion parameters estimated for each set of additional k-space lines to obtain an improved estimate of the motion parameters at a higher temporal resolution.

15. The method of claim 11, further comprising:
determining redundancies across the motion parameters by:
- forming groups of motion parameters such that each group contains motion parameters that are similar to each other; and
- dividing the k-space data into bins, wherein each bin corresponds to a respective group of motion parameters.

16. A magnetic resonance imaging apparatus comprising:
a radio frequency controller configured to drive an RF-coil comprising a multi-channel coil array;
a gradient controller configured to control gradient coils; and
a control unit configured to control the radio frequency controller and the gradient controller to:
- use an imaging protocol in which spatial encoding is performed using phase encoding gradients along at least one spatial dimension, and frequency encoding gradients along another spatial dimension, wherein k-space is sampled during an acquisition in a plurality of k-space lines oriented along a frequency encoding direction;
- acquire several k-space lines in one echo train, wherein the imaging protocol comprises a plurality of echo trains; and
- acquire at least one set of additional k-space lines within a central region of the k-space a plurality of times per echo train in more than 85% of the plurality of echo trains, wherein the additional k-space lines are acquired in addition to k-space lines required under the imaging protocol to acquire a magnetic resonance image dataset,
wherein each set of additional k-space lines of the at least one set of additional k-space lines is acquired at a pre-determined position within the plurality of echo trains.

* * * * *